US008381208B2

(12) United States Patent
Burke et al.

(10) Patent No.: US 8,381,208 B2
(45) Date of Patent: Feb. 19, 2013

(54) TRACKING APPLICATION INSTALLATION AMONG A PLURALITY OF CLIENT DEVICES

(75) Inventors: Michael R. Burke, Rochester, MN (US); Nicholas F. Campion, Rochester, MN (US); Joseph H. Peterson, Kasson, MN (US)

(73) Assignee: International Business Machines Corporation, Armonk, NY (US)

( * ) Notice: Subject to any disclaimer, the term of this patent is extended or adjusted under 35 U.S.C. 154(b) by 923 days.

(21) Appl. No.: 12/482,598

(22) Filed: Jun. 11, 2009

(65) Prior Publication Data
US 2010/0318986 A1 Dec. 16, 2010

(51) Int. Cl.
*G06F 9/445* (2006.01)
(52) U.S. Cl. ........ 717/174; 717/175; 717/178; 717/127; 717/130; 706/54; 706/61
(58) Field of Classification Search ........................ None
See application file for complete search history.

(56) References Cited

U.S. PATENT DOCUMENTS

| | | | | |
|---|---|---|---|---|
| 6,467,052 | B1 * | 10/2002 | Kaler et al. ..................... | 714/39 |
| 7,765,294 | B2 * | 7/2010 | Edwards et al. .............. | 709/224 |
| 7,779,404 | B2 * | 8/2010 | Movassaghi et al. ......... | 717/171 |
| 7,844,701 | B2 * | 11/2010 | Ramany et al. ............... | 709/224 |
| 8,040,811 | B2 * | 10/2011 | Edwards et al. .............. | 370/241 |
| 8,125,897 | B2 * | 2/2012 | Ray et al. ...................... | 370/229 |
| 8,255,902 | B1 * | 8/2012 | Satish ........................... | 717/174 |
| 2002/0157089 | A1 * | 10/2002 | Patel et al. ..................... | 717/178 |
| 2002/0166117 | A1 * | 11/2002 | Abrams et al. ................ | 717/177 |
| 2004/0204949 | A1 * | 10/2004 | Shaji et al. ......................... | 705/1 |
| 2006/0007944 | A1 * | 1/2006 | Movassaghi et al. ......... | 370/401 |
| 2008/0141240 | A1 * | 6/2008 | Uthe .............................. | 717/174 |
| 2009/0222813 | A1 * | 9/2009 | Johnson et al. ............... | 717/174 |
| 2010/0010968 | A1 * | 1/2010 | Redlich et al. ..................... | 707/3 |
| 2011/0161076 | A1 * | 6/2011 | Davis et al. ................... | 704/231 |
| 2011/0225577 | A1 * | 9/2011 | Wookey ........................ | 717/175 |
| 2011/0296405 | A1 * | 12/2011 | Ogura ........................... | 717/178 |
| 2011/0307884 | A1 * | 12/2011 | Wabe et al. ................... | 717/178 |
| 2012/0144386 | A1 * | 6/2012 | Wookey ........................ | 717/174 |
| 2012/0151469 | A1 * | 6/2012 | Wookey ........................ | 717/175 |

OTHER PUBLICATIONS

Title: Predicting performance of software systems during feasibility study of software project management, author: Geetha et al, source: IEEE, dated: Dec. 10, 2007.*
Title: Automated performance validation of software design: an industrial experience, author: Compare et al, source: IEEE, dated: 2004.*

* cited by examiner

*Primary Examiner* — Chameli Das
(74) *Attorney, Agent, or Firm* — Patterson & Sheridan LLP

(57) ABSTRACT

Embodiments of the invention provide the ability to determine whether a particular application may be safely added to a client computing device. Further, embodiments of the invention also allow for performing a rollback operation on clients experiencing a decrease of performance due to an addition of new software. For example, after a client updates to a new piece of software, a server may monitor the performance of the first client by analyzing a plurality of updates received from the first client. Each update may include a performance indicator. Using the updates, the server may detect a decrease in the performance of the first client. Upon detecting the decrease in the performance, the server may initiate a rollback to a previous state on the first client.

24 Claims, 8 Drawing Sheets

| CLIENT | STATE |
|---|---|
| CLIENT 1 | APPLICATION A, APPLICATION B, APPLICATION C, APPLICATION D, APPLICATION E |
| CLIENT 2 | APPLICATION A, APPLICATION B, APPLICATION C, APPLICATION D |
| CLIENT 3 | APPLICATION B, APPLICATION D, APPLICATION E |
| CLIENT 4 | APPLICATION A, APPLICATION B, APPLICATION E |

TRACKING APPLICATION INSTALLATION AMONG A PLURALITY OF CLIENT DEVICES

BACKGROUND OF THE INVENTION

1. Field of the Invention

This invention relates generally to application servers co-resident on a computer system and, more particularly, to tracking and preventing harmful effects from particular combinations of application programs.

2. Description of the Related Art

When attempting to upgrade a system, understanding how co-resident applications interact with one another is important to understanding the overall system resource requirements. One approach for determining the ability of different applications to co-reside with one another rely on a systems integrator evaluating a large number of possible combinations of software applications that may be deployed on the computing device to determine which combinations allow the computing device to function as desired. Testing in this manner may be acceptable when there are only a few applications but, as independent software vendor (ISV) and partner applications are added, the number of application combinations grows exponentially. It becomes impractical to test all of the combinations and, even if it were practical to test all combinations of existing applications, it still remains impractical to constantly test all possible new combinations each time a new application needs to be installed on the computing device (or an existing application is patched).

Another approach to whether a collection of applications may run on a particular computing device is to rely on the system requirements of third parties (ISVs and partners) and use those to estimate workloads on the computing device. This method, however, does not reveal whether two applications designed by different ISVs may have adverse effects on each other. Further, relying only on a stand-alone profile of each application (and combining applications based on their profile requirements) may not reveal negative interaction consequences as well as overstate system requirements. For instance, application A may require 2 GB of memory and application B may require 1 GB of memory, but together they may both be able to operate with 2.5 GB of memory. Combining the requirements also puts integrators at the mercy of the ISVs supplying the applications because an integrator may only be as accurate as the ISV's determination of the application's requirements.

SUMMARY OF THE INVENTION

Embodiments of the invention provide the ability to determine whether a particular application may be safely added to computing device. One embodiment of the invention includes a computer-implemented method for performing a rollback operation on a first client device. The method may generally include receiving a request to install a first application program on the first client device, identifying a first set of one or more application programs currently installed on the first client device, and determining whether a combination of the first application program and the first set of one or more programs has been installed on a second client device. Upon determining that the combination has not been installed on a second client device, the first application program is installed on the first client device, and one or more performance metrics of the first client device following the installation of the first application program are monitored. Upon determining that a decrease in the one or more performance metrics exceeds a specified threshold after the first application is installed, a message is sent to the first client device. In a particular embodiment, the message instructs the first client device to uninstall the first application program.

Another embodiment of the invention includes a computer readable storage medium containing a program, which, when executed, performs a rollback operation on a first client device. The operation may generally include receiving a request to install a first application program on the first client device, identifying a first set of one or more application programs currently installed on the first client device, and determining whether a combination of the first application program and the first set of one or more programs has been installed on a second client device. Upon determining that the combination has not been installed on a second client device, the first application program is installed on the first client device, and one or more performance metrics of the first client device following the installation of the first application program are monitored. Upon determining that a decrease in the one or more performance metrics exceeds a specified threshold after the first application is installed, a message is sent to the first client device. In a particular embodiment, the message instructs the first client device to uninstall the first application program.

Still another embodiment of the invention includes a system having a processor and a memory containing a program, which, when executed by the processor, performs a rollback operation on a first client device. The operation may generally include receiving a request to install a first application program on the first client device, identifying a first set of one or more application programs currently installed on the first client device, and determining whether a combination of the first application program and the first set of one or more programs has been installed on a second client device. Upon determining that the combination has not been installed on a second client device, the first application program is installed on the first client device, and one or more performance metrics of the first client device following the installation of the first application program are monitored. Upon determining that a decrease in the one or more performance metrics exceeds a specified threshold after the first application is installed, a message is sent to the first client device. In a particular embodiment, the message instructs the first client device to uninstall the first application program.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
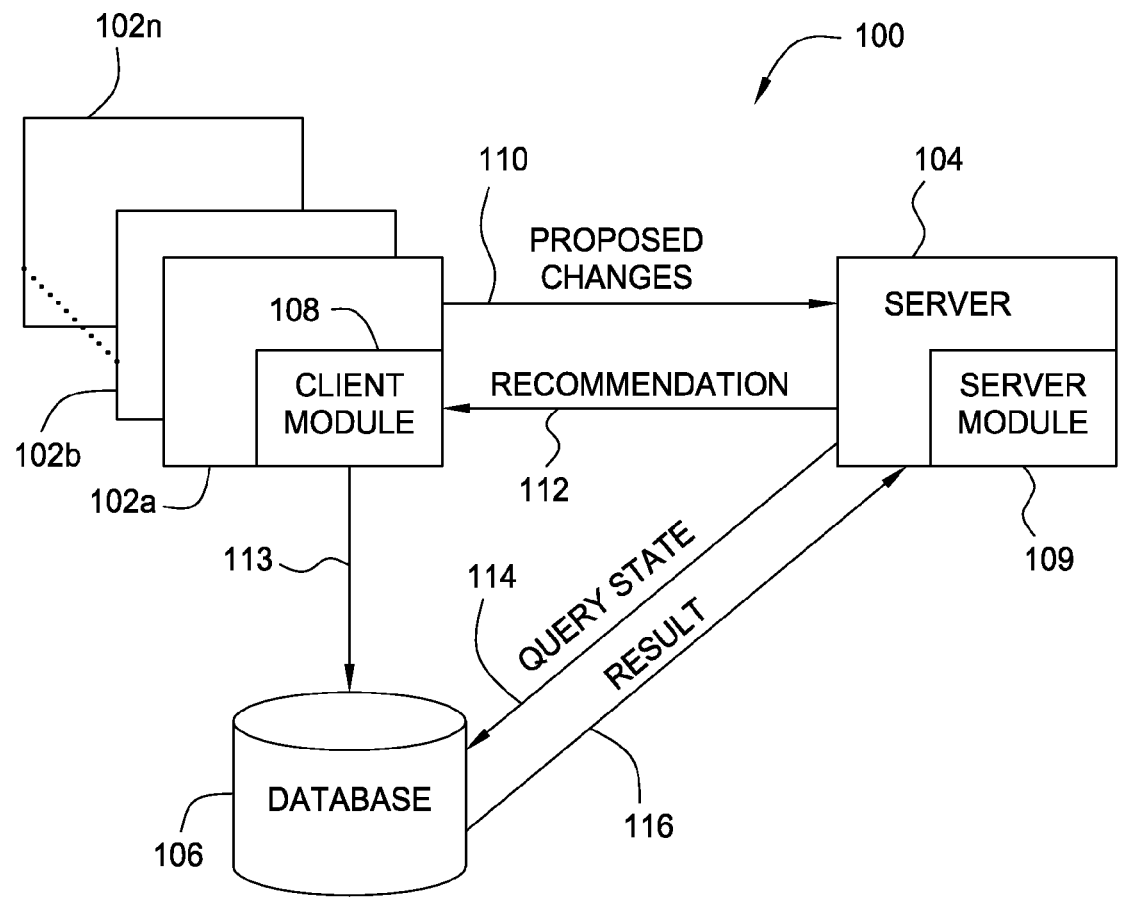
FIG. 1 illustrates an example of a system configured according to one embodiment of the invention.

Embodiments of the invention provide the ability to determine whether a particular application may be safely added to computing device, i.e., whether adding an application to a particular client device will be disruptive to other applications already running on the server or whether the new application itself can co-exist with the applications already present. Advantageously, information about which co-resident applications may safely run on a computing device may be determined without requiring that a system integrator test every possible combination of applications.

In one embodiment, client deployments are tracked, and aggregated information is used about the deployments to determine how co-resident applications affect the performance of one another (as well as overall system performance). Instead of the traditional profiling focused on each application standing alone, embodiments of the invention may evaluate what happens when a new application is added to an existing computing environment running some group of existing applications. Performance and resource usage may be tracked on client deployments and used to adjust system requirements reported to potential users. In short, rather than testing all possible application combinations, users may generally install any configuration, and the system evaluates whether another client has tried to install the same configuration and determined it to be a non-functional. In this manner, a collection of clients effectively performs the configuration tests, and the clients share the configuration information with one another.

Further, embodiments of the invention also allow a rollback operation to be performed on a system experiencing a performance decrease following the addition of new software (or update to existing software). However, rather than focus on the performance of the software in isolation, the performance decrease is evaluated relative to other applications installed on the system as well as the characteristics of the system itself. For example, after a client updates to a new software application, a server may monitor the performance of the first client by analyzing a plurality of updates received from the first client. Each update may include a performance indicator. Using the updates, the server may detect a decrease in the performance of the first client. Upon detecting the decrease, the server may initiate a rollback to a previous state on the first client.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

One embodiment of the present invention includes two modules, a client module running on a client's computing system (referred to as the "client" or "client system") and a server module resident on a server (referred to as the "server"). Note, the "client" itself may be a server with respect to other clients. The client module tracks system performance in intervals called "states." Each state is associated with a set of applications installed on the client. The state measures a duration of time over which the set of applications on the system did not change. A state may also reference the hardware configuration of the client and a previous state. Any time a new software component, application or module is added to the client system, the client module creates a new state, and the time of the created state starts. In terms of analysis, the performance of a state describes the observed average performance of a set of applications that are co-resident on a single client machine for some duration. Periodically (as well following the end of any given state's duration), the current state's performance information may be recorded in a database. Such information may also be recorded remotely by service on demand.

In one embodiment, the server module has two roles: managing the distribution of software and correlating the performance information gathered from multiple clients. The computer server on which the server module is resident may also provide a location to which clients may connect and download new applications (or updates to existing applications). The server aggregates the state information from multiple clients to identify states in which a given application does not function properly. When a particular client, or user of that client, attempts to purchase and/or install a new application, the client's current state is compared with the aggregated state information stored on the server to determine whether the proposed new application state will function.

FIG. 1 shows an example of a system 100 according to one embodiment of the present invention. The system includes a plurality of clients 102a, 102b . . . 102n, a server 104 and a database 106. As shown, the database 106 is a separate unit. In some embodiments, the database 106 may be part of the server 104. As shown, the clients 102, the server 104 and the database 106 are connected to one other via various communication lines (e.g., communication lines 110, 112, 113, 114, and 116). In some embodiments, the communication lines may be part of a communications network such as the Internet.

As shown, client 102 generally represents a computer system having a processor, a memory, storage devices (e.g., magnetic disk drives), etc. Of course, client 102 may also be other computing platforms having a processor, memory, and storage for applications and data, e.g., a PDA, mobile phone, netbook PC, and the like. Client 102 may also have a collection of installed application programs executed by users of the client 102. The particular collection of applications installed, as well as the system performance of client 102, may be monitored by client module 108. Similarly, the server 104 generally represents a computer having a processor, a memory, and storage devices. As described in greater detail below, in one embodiment, the server 104 executes the server module 109 in order to identify any risks associated with allowing a client 102 to transform from one state to another state. As shown, for example, the server 104 accesses the database 106 and determines the risks associated with a particular state change request received from a client 102.

The communication links 110, 112, 113, 114, and 116 may occur over any type of known network including, but not limited to, a wide area network (WAN), a local area network (LAN), a global network (e.g. Internet), and the like. The network may be implemented using a wireless network or any kind of physical network implementation known in the art. A client 102 may be coupled to the server 104 and the database 106 through multiple networks (e.g., intranet and Internet) so that not all client systems 102 are coupled to the server 104 through the same network. In one embodiment, clients 102 may be connected directly to the server 104 (i.e., not through a network) and the server 104 may be connected directly to or contain the database 106.

In one embodiment, the database 106 may store information relating to state information (collections of co-resident applications) for a variety of clients 102 and may be implemented using a variety of devices for storing electronic information. It is understood that the database 106 may be implemented using memory contained in one or more servers (e.g., server 104) or that it may be comprised of separate physical devices. Information stored in the database 106 may be retrieved and manipulated via the server 104 and/or via the client 102.

As discussed above, each client 102 may include a client module 108. In one embodiment, the client module 108 may be configured to monitor system performance for intervals defined as a client system "state." Each state is associated with a set of applications installed on that client. Each state measures a duration of time over which the set of applications on the client 102 did not change. A state may also reference the hardware configuration of the client in the previous state. Any time a new software application (or a new version of an installed software application) is added to the client 102, the client module 108 may initiate a new state. Additionally, the performance characteristics of client 102 during a given state may provide a measure of an average observed performance of a set of applications that are co-resident on a single client machine for some duration (i.e., for some state). Periodically, and at the end of a state's duration, the current state's performance information may be recorded in the database 106. This information also may be recorded at any time at the request of server module 109.

The server 104 may include a server module 109. The server module 109 may have two main roles: managing the distribution of software to clients 102 and correlating the performance information gathered from multiple clients. The server 104 on which the server module 109 is resident may host a location (such as a web-site) where users of a client 102 may go to download new applications. When the client 102, or user of that client 102, attempts to purchase and/or install a new application, the server module 109 compares the client's current state with the aggregated state information stored in the database 106 to determine if the proposed new application state will function.

In one embodiment, the server 104 may limit the ability of a client 102 to move to a state that has previously been determined to be unsafe (or simply result in poor application performance for some applications). For example, the server 104 may simply prevent a client from downloading and installing software that would result in that client having a known, disfavored configuration state. Similar, the server 104 may limit the ability of a client 102 to transform to a state similar to one determined unsafe by monitoring the performance of other clients 102. In other embodiments, the server 104 may allow the installation and warn a user of the client 102 that installing the software may adversely effect the operation of the client 102. For instance, the server may inform the client 102 that a particular installation may move the client 102 into a "marginal" or "degraded" state. Other states that may be utilized in embodiments of the present invention may include "healthy" and "non-functional." A non-functional state may not be allowed and a healthy state may be allowed without any user of a particular client 102 input. Marginal and degraded states may require that the user of client 102 make a decision as to whether to install the particular application after receiving a notification that the proposed state may be place the client 102 in either of these states.

In some cases, a client 102 may already be in a state that is later deemed unsafe. In these cases, when the server 104 determines that the state is deemed unsafe, the server 104 may initiate a rollback to a previous state that is deemed safe for the client 102. For example, the server 104 may direct the client 102 to uninstall software that is suspected of degrading performance. Alternatively, in cases where a new version of software is suspected of degrading performance, the server 104 may direct the client 102 to revert back to a previous version of the software that is deemed safe. In one embodiment, upon determining that a rollback for a client 102 may be required, the server 104 may initiate the rollback for the client 102. In another embodiment, the server 104 may inform the client 104 that it is currently in a state that may adversely effect the operation of the client 102. In this case, the client 102 may be given an option to either allow the rollback operation, or alternatively, remain in a then current state.

Embodiments of the invention may be particularly useful when hardware resources are constant (or at least relatively similar) across clients 102. For instance, clients 102 each may have the same hardware capabilities, but users potentially may install different collections of applications. In one embodiment, clients 102 may represent a fixed hardware platform where the applications for the hardware platform are made available over server 104. In such a case, the server 104 may generally coordinate the availability, distribution, and installation of a given software application on the platform. Further, in such a case, the server may monitor the application state on many instances of the hardware platform and identify when a particular combination of applications is disruptive. Thus, rather than having to give specific hardware resource requirements for software applications (as the hardware platform is the same), the server 106 may simply examine combinations actually installed by users and determine which sets are capable of running simultaneously on the same client. Or stated another way, the server 106 may determine when two applications do not perform well in conjunction with one another. As different hardware versions become available, different domains of application states may be tracked. This is significant, because application state A on client version A would not necessarily run the same as state A on client version B (with different hardware).

The implementation of "state tracking" by the server module 109 may involve querying a table database 106 that contains all the known application states (a software state that has been used) for a single model of a client. To determine these states, each software application available to be installed on a client device may be assigned a unique ID. Whenever a client 102 creates a new application state using a set of applications that has not been previously used, a new entry is added to the table. As applications are installed, the performance information for the client's previous state is uploaded to the server 104 and is entered into the table in the database 106. Server module 109 may reference this information when clients 102 request that a given application be installed. Further, users may make more informed decisions related to a given application, prior to purchasing and installing a given application.

Illustratively, FIG. 1 shows the process for requesting, evaluating, and installing a given application to a client system 108 which already has a known state (i.e., a known collection of installed software applications). The following description references communication links 110, 112, 113, 114 and 116. The references to these links describes the data flow among different components of the system 100.

Periodically, the client module 108 sends a status update along communication path 113 to the database 106. Although communication path 113 is shown going directly from client module 108 to database 106, the status update alternatively may be routed through the server module 109. The status update may include, for example, an identifier for the client 102 on which the module is resident, a reference to the collection of applications (and application versions) running on the client 102, and the hardware configuration (or version) of the client 102. In one embodiment, the information may be represented as a hash value generated from this information.

The status update may also include data reflecting the operational performance of client 102 in its then current state. The information sent could include, e.g., processor consumption, memory consumption or application specific metrics such as pages served per second (web server) or dropped packets (Voice over IP). The information from the status update may be stored in the database 106. In addition, each time a client 102 adds a new application, upgrades an application, or removes an application, the client 102 may transmit a status update to the database. The change of state message may resemble a typical status update. A message indicating that the application list (which may also identify the respective versions of the applications) is changed (or a current hash value regarding this information) is transmitted to the server 109. As discussed above, when the server module 109 identifies that a new combination of applications or versions (or just a new hash value representing same) is supplied by a client, a new state is created.

Applications may be installed on a client 102 in a variety of ways. For example, a client or user of client 102 may choose one or more applications to install from a group of applications. An indication of such applications may be presented on the server 109. In one embodiment, the server 104 may contain a listing of available applications and have links to another location where the application is stored for download. Alternatively, copies of the applications may be stored on the server 104 for download directly.

In one embodiment, the client 102 submits a proposed change message to the server 104 via communication link 110. The proposed change message may include a client ID and an application requested or it may contain a current state and a proposed new state. Regardless, the server module 109 may respond by querying the database 106 (as indicated by communication link 114). The results of the query may be transmitted back to the server module 109 as indicated by communication link 116. Based on the results, the server module 109 may block the download of particular application, may alert a user of the client 102 that downloading the software may adversely affect the client 102, or may either indicate that the download is acceptable or just allow the download to occur.

Figure 2:
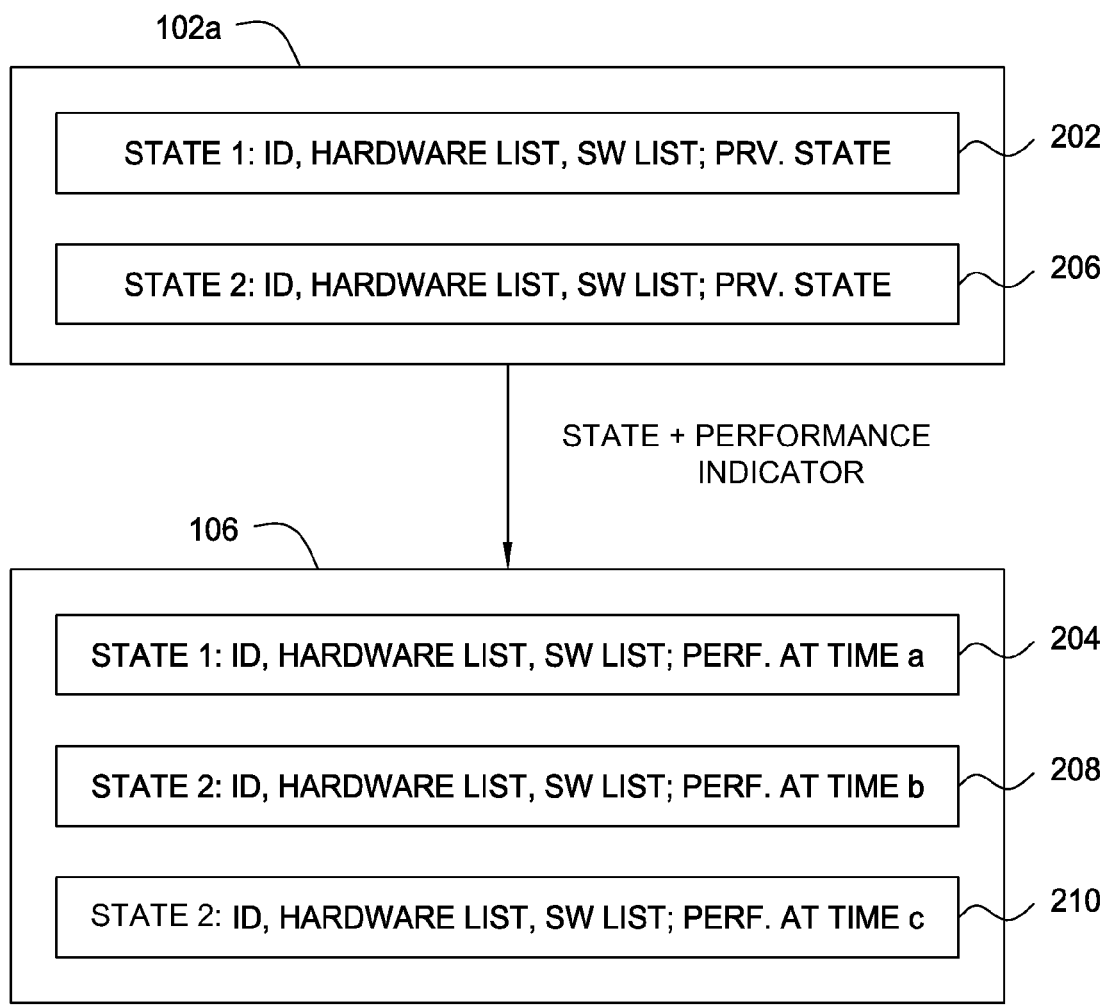
FIG. 2 illustrates various states over time in a first client and an example of how those states may be represented in a database, according to one embodiment of the invention.

FIG. 2 shows an example of multiple states over time for a first client 102a and an example of how those states are represented in the database 106. At a time (a), the client 102 may be in a first client state 202. This state may be characterized by one or more of the following attributes: a client identification (ID), a hardware list, an application list, application version information, and a previous state (or a hash constructed from these values). The hardware list may identify some or all of the hardware comprising the client 102a, or it may simply contain a hardware version identifier (representing, for example, the particular hardware version of the client 102, but may include operating system or firmware data versions as well). As discussed above, in some systems, the hardware configuration may be the same for all clients 102. In such a case, the hardware list may not be needed (but the firmware or operating system revisions may be relevant). The previous state may be an indication of the state the machine was in before the current state. The performance indicator may, for example, be a representation of the number of errors occurring in the system, system speed, memory usage, CPU usage, disk accesses, network latency, and the like.

In the database 106, the first client state 202 may be represented by the first state 204. This first state 204 may include a hardware list, a software list and a performance indicator at a particular time. In this example, the particular time is a first time (a). The "time a" designation may represent a time at which a client changed states or when a client sent a status update.

At a second time (b), the client 102a may be in a second state 206. This second state may by characterized by the same fields as the first state 202 but have a different application state and a different previous state (e.g. the previous state for the second state 206 is now the first state 202). In some embodiments, the previous state may be represented by an indication of applications added (or deleted) that caused the client 102a to change states.

As shown, the database 106 includes two more records, 208 and 210, for the second state. The first record of the second state 208 may indicate a time b when that particular record was entered. A second record of the second state 210 is recorded at a later time, time c. It will be understood that many clients 102 may be coupled to the database 106. Each time a new application list is received from any of these clients, a new state may be created and the continued viability of operation in that state is tracked.

Figure 3:
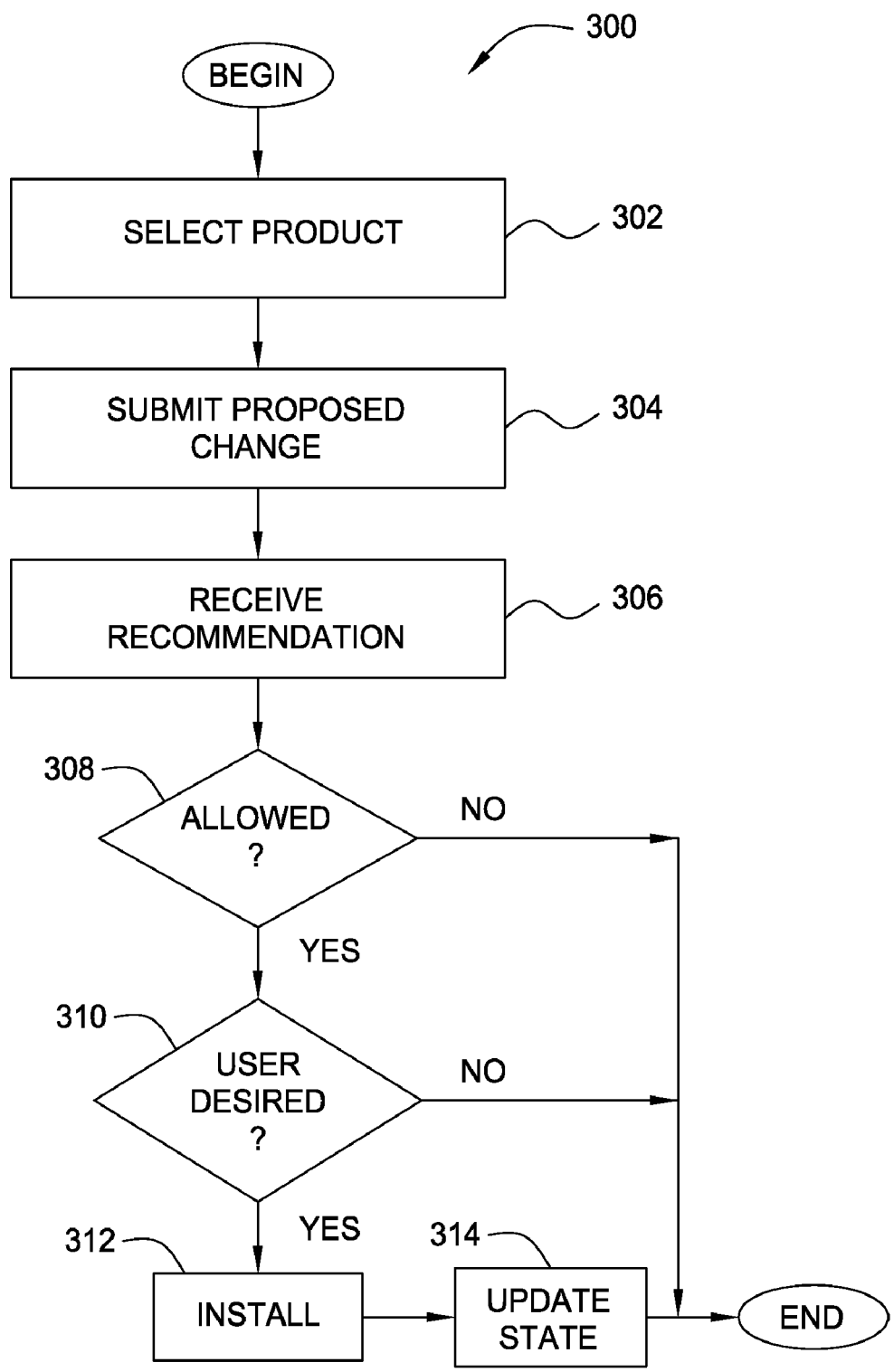
FIG. 3 illustrates a method for requesting a proposed state change, according to one embodiment of the present invention.

FIG. 3 illustrates a method for requesting a proposed state change, according to one embodiment of the present invention. As shown, the method 300 begins at step 302, where a product may be selected for addition to a particular client 102. For example, the selection of a product may entail a user causing the client 102 to request a resource from a website maintained by a server 104 listing available applications. At step 304, a proposed state change is submitted to the server 104. The proposed state change may include an indication of the current state of the client 102. In some embodiments this current state may be represented by the application list described above. The proposed change may identify the application that the client 102 selected to install at step 302.

At step 306, the client 102 may receive a recommendation regarding any risk associated with adding the desired application. For example, at step 308, if the server 104 determines the proposed change is allowed, the recommendation received at step 306 may indicate that other clients have executed in the proposed state without substantial decreases in performance. If the proposed state is known (based on the same state being disruptive to other clients) then the recommendation at step 306 may indicate as such, and provide a message regarding what applications are believed to conflict with one another. In such case, the product selected at step 306 is not downloaded or installed. However if the proposed state (adding the product selected at step 302 to the users client) is allowed, then at step 310, the user may be prompted to determine whether or not they want to download and install the application. As discussed above, a recommendation may include notification that, while the application may be installed, the installation of the program may degrade performance of the client. Hence, the choice provided at step 310 allows the user to determine whether the possible consequences outweigh the rewards of installing the application. The method proceeds to step 312, where the program is downloaded and installed. Subsequently, at step 314 the client state is updated. The method ends should the user decline to install a given application (after receiving the recommendation at step 306).

Figure 4:
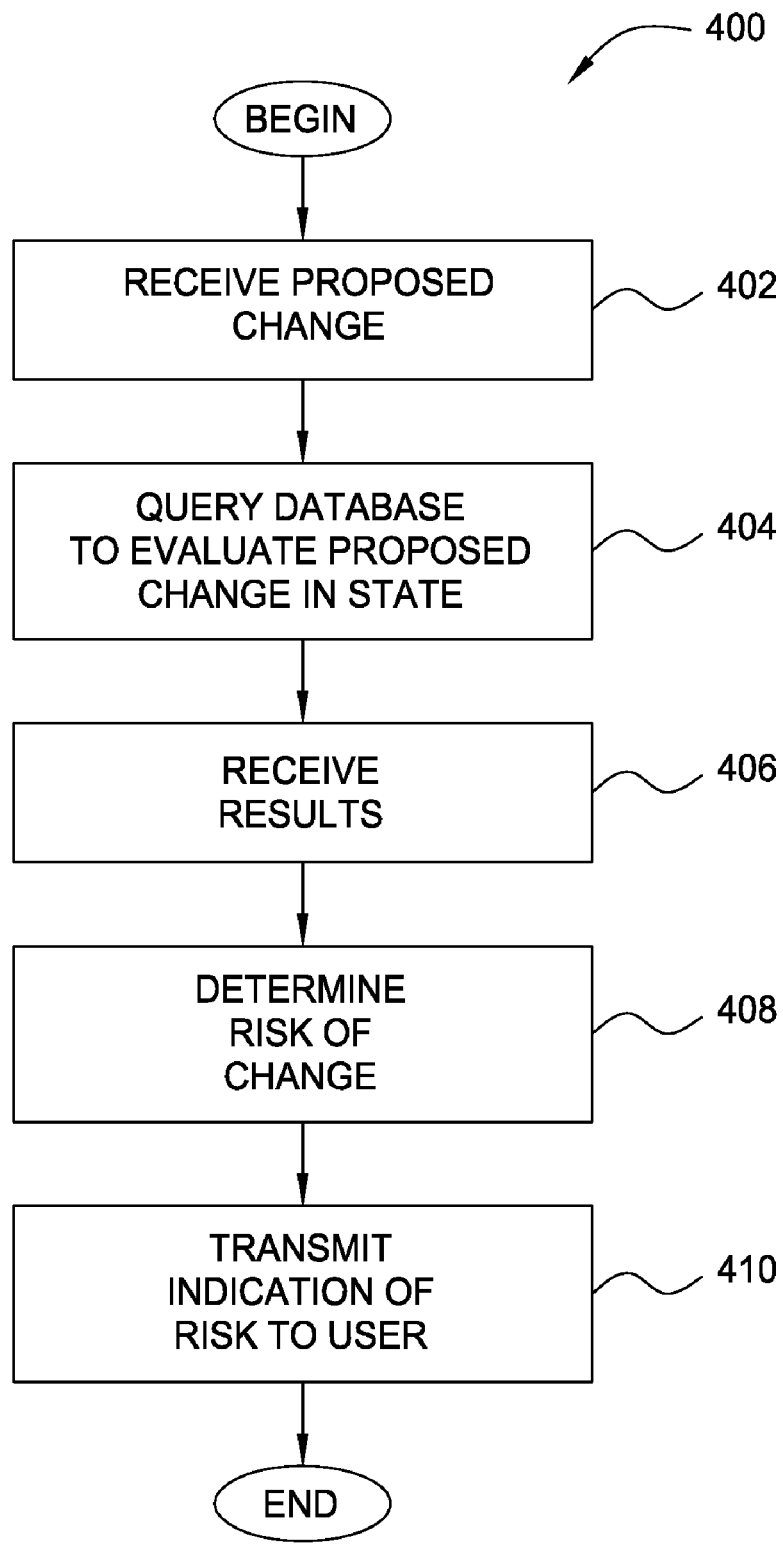
FIG. 4 illustrates a method for processing a request from a client, according one embodiment of the present invention.

FIG. 4 illustrates a method for processing a request from a client, according to one embodiment of the present invention. At step 402, proposed changes are received from a client 102. At step 404, the database 106 is queried to see if the state requested by the client has already been created. If the requested state does not exist, a new state is created. At step 406 results are received from the database. At step 408, the risk of the proposed new state or risk of change is determined. At step 410, the risk is transmitted back to the client.

Figure 5:
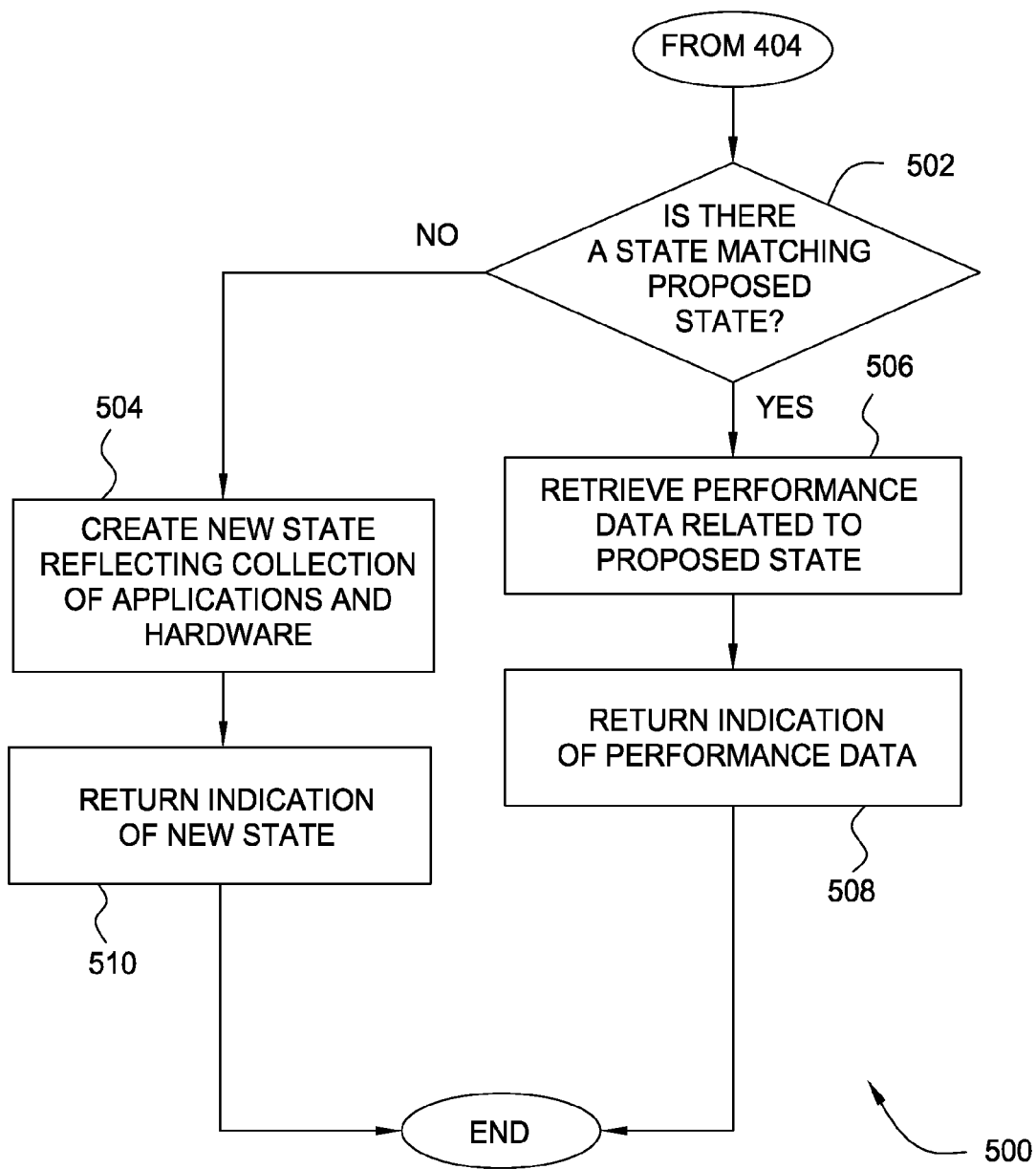
FIG. 5 further illustrates aspects of the method first shown in FIG. 4, according one embodiment of the invention.

FIG. 5 illustrates an example of step 404 of the method shown in FIG. 4. As shown, the method 500 begins at step 502, where the database 106 is queried to determine whether a state matching the proposed state exists. If the proposed state exists, meaning performance data for this state running on another client is available, the server may obtain the performance data for evaluation at step 506. If such a state does not exist, at step 504 a state is created reflecting the collection of applications and hardware, and the server 104 is informed that the proposed state is a new state (at step 510) which lacks any performance history in the database 106. Otherwise, once the performance data is retrieved, the performance data is transmitted to the server at step 508.

In some cases, the server module 109 may determine if the proposed state by the client 102 is similar to a state deemed unsafe or one that has lead to unacceptable performance degradation. For example, a user may request to install an application known to conflict with an installed application (based on the performance data in database 106), but request to install a newly released version of that application (for which performance data is not available). In such a case, the server module 109 may determine that the proposed state is sufficiently similar to the known state that the proposed state should be presumed to result in the same performance degradation. And in response, the server module 109 may prevent the client from installing the proposed application or simply warn that the previous version was known to result in unacceptable performance degradation. In the latter case, the server module 109 may monitor the performance of the application once installed. That is, the server module 109 may gather performance data for the new state (differing from the previous one only by version of one of the software applications).

Figure 6:
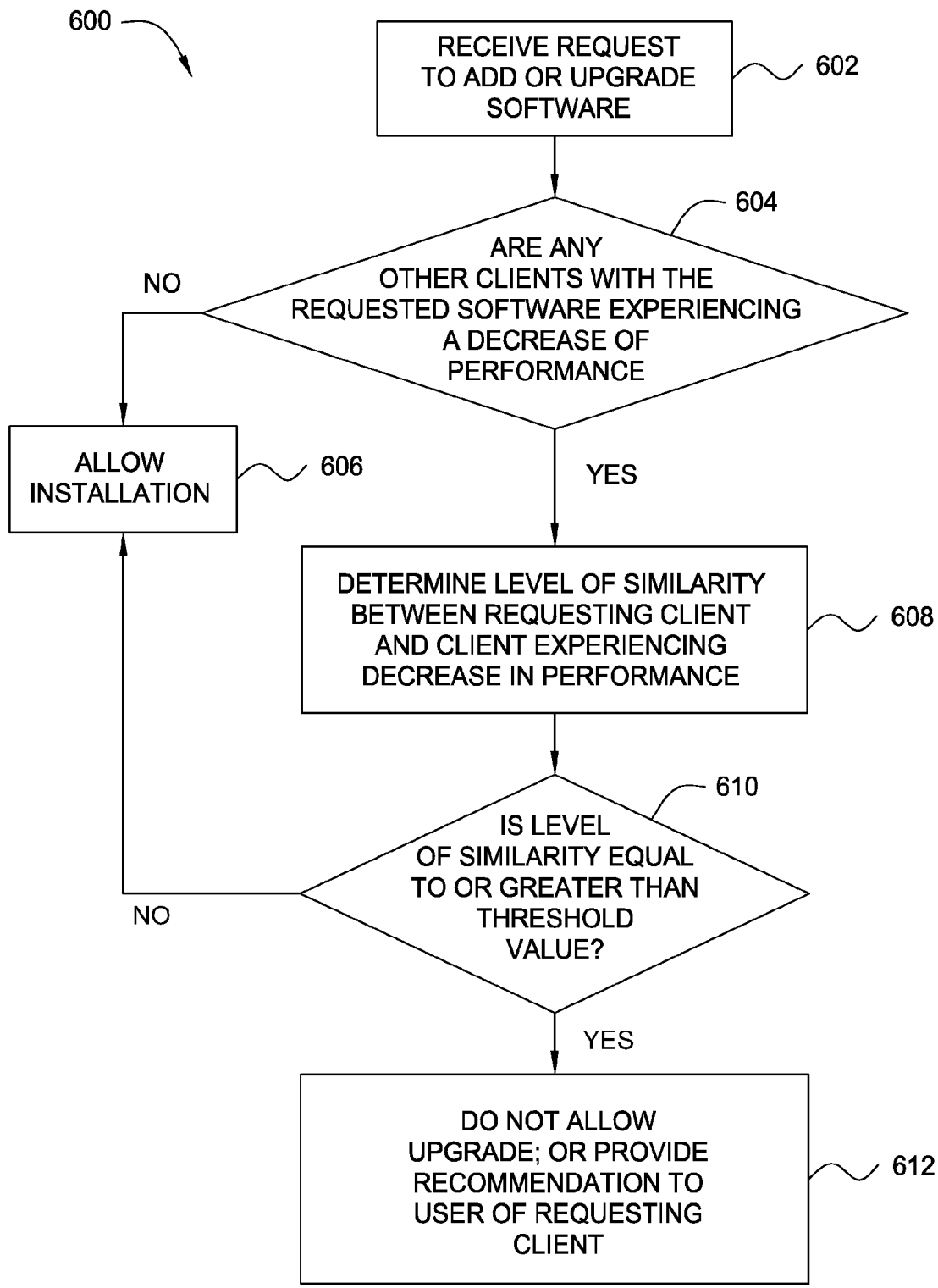
FIG. 6 illustrates a method for determining if a proposed final state is similar to an unsafe state of another client, according to one embodiment of the invention.

FIG. 6 is method for determining if a proposed state is similar to an unsafe state of another client, according to one embodiment of the invention. The method may be described with reference to FIG. 7, which illustrates a table of states for different clients, according to one embodiment of the invention. For simplicity, only the respective application lists for each client state are shown. The method 600 begins at step 602, where the server 104 receives a request from a client 102 to add a new application (or to upgrade or patch a currently installed application). For example, referring to FIG. 7, Client 2 may request to upgrade to a new version of Application B. At step 604, the server 104 may determine if any other clients have suffered a decrease in performance while using the upgraded version of Application B (in conjunction with other applications installed on client 2). For example, the server 104 may have previously determined that Client 1, as shown in FIG. 7, suffers from a decrease in performance after updating to the new version of Application B.

If at step 604, it is determined that none of the clients have suffered from a decrease of performance, then at step 606, the update is allowed. However, if it is determined that another client has suffered from a decrease of performance, then at step 608, the state of the requesting client (in this case, Client 2) is compared to the state of the client suffering from the decrease of performance (in this case, Client 1) to determine the similarities between the states.

Figure 7:
FIG. 7 illustrates an example of a table of states for different clients, according to one embodiment of the invention.

For example, Client 1 is shown in FIG. 7 as having the following applications: Application A, Application B, Application C, Application D, and Application E. Client 2 is shown as having Application A, Application B, Application C, and Application D. In this case, the server 104 may determine that Client 2 is 80% similar to Client 1. In one embodiment, at step 610, the server 104 may compare the level of similarity to a threshold value. If the level of similarity is equal to or above the threshold value, the server 104 may determine that the requesting client 102 (i.e. Client 2) is also likely to experience a decrease of performance if it upgrades to the new version of Application B. The threshold value may be configurable by the server 104. In the present example, the threshold value may be set to 75%. In this case, the level of similarity between Client 1 and Client 2 exceeds the threshold.

In one embodiment, if the level of similarity is equal to or greater than the threshold value, at step 612 the server 104 may not allow the upgrade, thereby preventing the requesting client 102 from suffering from a possible decrease in performance. In another embodiment, at step 612 the server 104 may provide a recommendation to the client 102 (or a user of the client 102) as to the risk associated with upgrading the desired application.

For example, a recommendation may include notification that, while the application may be installed, the installation of the program may degrade performance of the client 102. Hence, the user may be provided a choice that allows the user to determine whether the possible consequences outweigh the rewards of installing the application.

As another example, suppose at step 602, server 104 receives a request from Client 3 to upgrade to Application B. As shown in FIG. 7, Client 3 has the following applications: Application B, Application, D and Application E. Thus, when, at step 608, the server 104 determines the level of similarity between Client 1 and Client 3, the server 104, may determine that Client 3 is 60% similar to Client 1. Assuming that the threshold value is set to 75%, the server 104, at step 610, may determine that the level of similarity does not exceed the threshold value. Therefore, the method continues to step 606, where the server 104 allows the update. In other words, the server 104 determines that upgrading to the newer version of Application B may not result in a decrease of performance for Client 3.

In one embodiment, clients 102 experiencing a decrease in performance, or in a state similar to such a state (as described above in FIG. 7) may rollback to a previous state that did not cause a decrease in performance. Additionally, clients 102 that are in those states but have not yet experienced a decrease in performance may preemptively rollback to a previous state. In doing so, clients 102 may avoid a possible decrease in performance.

Figure 8:
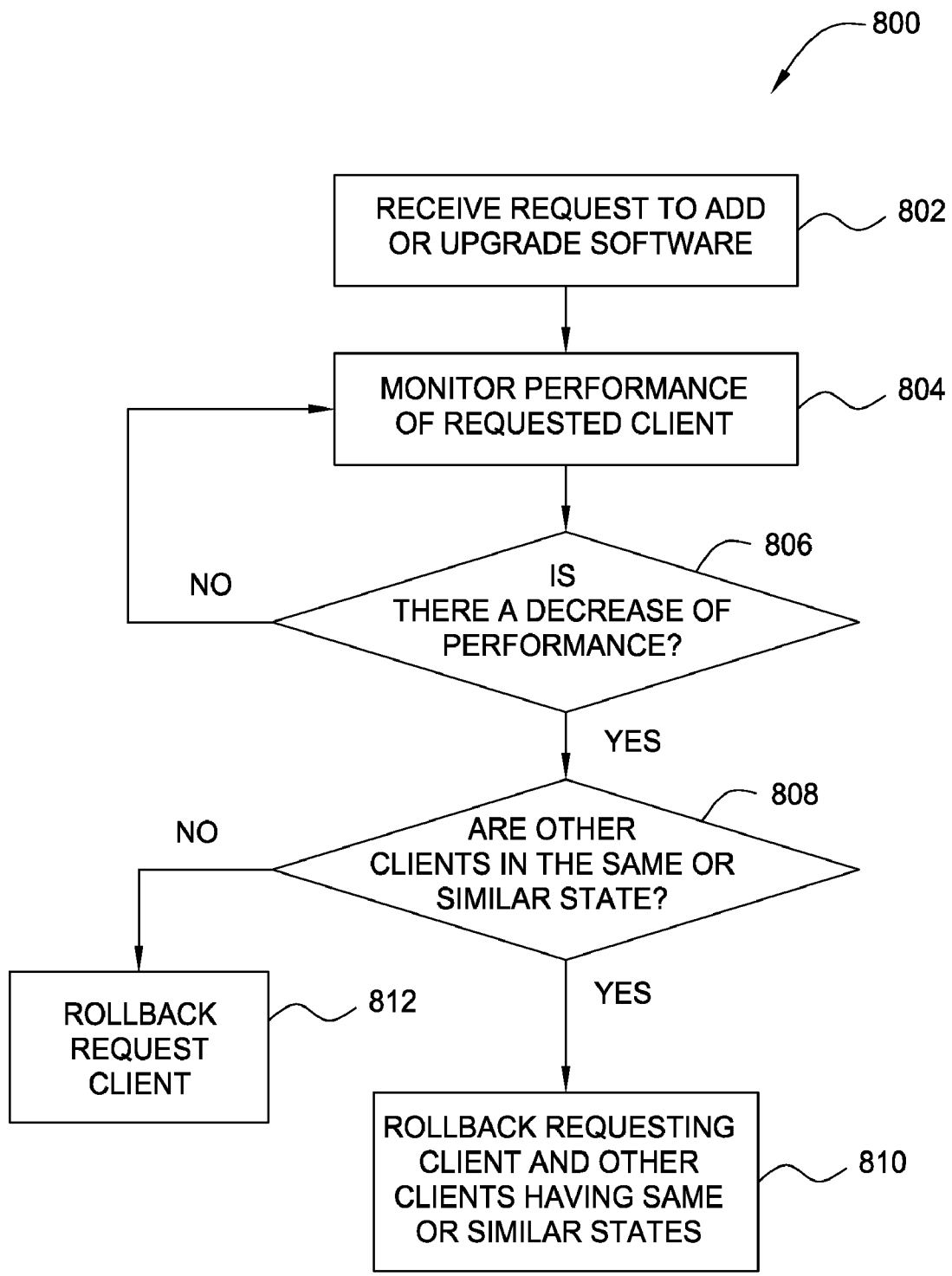
FIG. 8 illustrates a method for performing a rollback operation, according to one embodiment of the invention.

FIG. 8 is method for performing a rollback operation, according to one embodiment of the invention. The method 800 begins at step 802, where a server 104 receives a request from a first client 102 to add or upgrade to a new version of software. At step 804, the server 104 may allow the installation and subsequently monitor the performance of the client 102 as described above. If, at step 806, the server 104 determines that the client 102 is suffering from a decrease of performance, the server 104, at step 808, determines if other clients 102 are in the same state or in a similar state (as discussed above in FIG. 7) as the first client 102.

If the server 104 determines that other clients 102 are in the same or similar state as the first client 102, then at step 810, the server 104 may initiate a rollback operation for both the first client 102 and the other clients having the same or similar state as the first client 102. However, if the server 104 determines that other clients are not in the same or similar state as the first client 102, then at step 812, the server 104 may initiate a rollback operation for only the first client 102.

In one embodiment, when initiating a rollback operation, the server 104 may request authorization from the user of the client 104 before performing the rollback operation. In this case, the user may decide whether or not to perform the rollback operation. In another embodiment, the server 104 may automatically perform the rollback operation without authorization from the user.

Advantageously, as described herein, embodiments of the invention provide the ability to determine whether a particular application may be safely added to a client computing device. Further, embodiments of the invention also allow for performing a rollback operation on clients experiencing a decrease of performance due to an addition of new software. For example, after a client updates to a new piece of software, a server may monitor the performance of the first client by analyzing a plurality of updates received from the first client. Each update may include a performance indicator. Using the updates, the server may detect a decrease in the performance of the first client. Upon detecting the decrease in the performance, the server may initiate a rollback to a previous state on the first client.

While the foregoing is directed to embodiments of the present invention, other and further embodiments of the invention may be devised without departing from the basic scope thereof, and the scope thereof is determined by the claims that follow.

What is claimed is:

1. A computer-implemented method for performing an operation on a first client device among a plurality of client devices, comprising:

receiving a request to install a first application on the first client device;

determining, by operation of one or more computer processors, whether the first application is currently installed on a second client device among the plurality of client devices;

upon determining that the first application is currently installed on a second client device, accessing a database to determine whether one or more performance metrics of the second client device decreased beyond a first specified threshold as a result of installing of the first application on the second client device;

upon determining that one or more performance metrics of the second client device decreased beyond the first specified threshold as a result of installing the first application on the second client device, determining whether a level of similarity between the first client device and the second client device exceeds a second specified threshold; and upon determining that the level of similarity does not exceed the second specified threshold, allowing installation of the first application on the first client device.

2. The computer-implemented method of claim 1, wherein, upon allowing installation of the first application on the first client device, the method further comprises:

monitoring one or more performance metrics of the first client device;

determining whether the one or more performance metrics of the first client device have decreased beyond a third specified threshold as a result of installing of the first application on the first client device; and upon determining that the one or more performance metrics of the first client device have decreased beyond the third specified threshold as a result of installing of the first application on the first client device, initiating an operation to roll back installation of the first application on the first client device.

3. The computer-implemented method of claim 2, further comprising:

upon initiating the operation to roll back installation of the first application on the first client device, requesting authorization from a user of the first client device.

4. The computer-implemented method of claim 1, further comprising:
upon determining that the level of similarity exceeds the second specified threshold, sending a notification to the first client device.

5. The computer-implemented method of claim 4, wherein the notification declines the request to install the first application on the first client device.

6. The computer-implemented method of claim 4, wherein the notification comprises a recommendation indicating risk associated with installing the first application on the first client device.

7. The computer-implemented method of claim 1, wherein determining the level of similarity between the first client device and the second client device comprises comparing a combination of applications installed on the first client device with a combination of applications installed on the second client device.

8. The computer-implemented method of claim 1, wherein the one or more performance metrics of each of the first client device and the second client device include at least one of a number of errors, system speed, memory usage, CPU usage, disk accesses, and network latency.

9. A non-transitory computer readable medium storing a program which, when executed, performs an operation on a first client device among a plurality of client devices, the operation comprising:
receiving a request to install a first application on the first client device;
determining whether the first application is currently installed on a second client device among the plurality of client devices;
upon determining that the first application is currently installed on a second client device, accessing a database to determine whether one or more performance metrics of the second client device decreased beyond a first specified threshold as a result of installing of the first application on the second client device;
upon determining that one or more performance metrics of the second client device decreased beyond the first specified threshold as a result of installing the first application on the second client device, determining whether a level of similarity between the first client device and the a second client device exceeds a second specified threshold; and
upon determining that the level of similarity does not exceed the second specified threshold, allowing installation of the first application on the first client device.

10. The non-transitory computer readable medium of claim 9, wherein, upon allowing installation of the first application on the first client device, the operation on the first client device further comprises:
monitoring one or more performance metrics of the first client device;
determining whether the one or more performance metrics of the first client device have decreased beyond a third specified threshold as a result of installing of the first application on the first client device; and
upon determining that the one or more performance metrics of the first client device have decreased beyond the third specified threshold as a result of installing of the first application on the first client device, initiating an operation to roll back installation of the first application on the first client device.

11. The non-transitory computer readable medium of claim 10, wherein the operation on the first client device further comprises:
upon initiating the operation to roll back installation of the first application on the first client device, requesting authorization from a user of the first client device.

12. The non-transitory computer readable medium of claim 9, wherein the operation on the first client device further comprises:
upon determining that the level of similarity exceeds the second specified threshold, sending a notification to the first client device.

13. The non-transitory computer readable medium of claim 12, wherein the notification declines the request to install the first application on the first client device.

14. The non-transitory computer readable medium of claim 12, wherein the notification comprises a recommendation indicating risk associated with installing the first application on the first client device.

15. The non-transitory computer readable medium of claim 9, wherein determining the level of similarity between the first client device and the second client device comprises comparing a combination of applications installed on the first client device with a combination of applications installed on the second client device.

16. The non-transitory computer readable medium of claim 9, wherein the one or more performance metrics of each of the first client device and the second client device include at least one of a number of errors, system speed, memory usage, CPU usage, disk accesses, and network latency.

17. A system, comprising:
a processor; and
a memory containing a program, which when executed by the processor performs an operation on a first client device among a plurality of client devices, the operation comprising:
receiving a request to install a first application on the first client device;
determining whether the first application is currently installed on a second client device among the plurality of client devices;
upon determining that the first application is currently installed on a second client device, accessing a database to determine whether one or more performance metrics of the second client device decreased beyond a first specified threshold as a result of installing of the first application on the second client device;
upon determining that one or more performance metrics of the second client device decreased beyond the first specified threshold as a result of installing the first application on the second client device, determining whether a level of similarity between the first client device and the second client device exceeds a second specified threshold; and
upon determining that the level of similarity does not exceed the second specified threshold, allowing installation of the first application on the first client device.

18. The system of claim 17, wherein, upon allowing installation of the first application on the first client device, the operation on the first client device further comprises:
monitoring one or more performance metrics of the first client device;
determining whether the one or more performance metrics of the first client device have decreased beyond a third specified threshold as a result of installing of the first application on the first client device; and upon determining that the one or more performance metrics of the first client device have decreased beyond the third specified threshold as a result of installing of the first application on the first client device, initiating an operation to roll back installation of the first application program on the first client device.

19. The system of claim 18, wherein the operation on the first client device further comprises:

upon initiating the operation to roll back installation of the first application on the first client device, requesting authorization from a user of the first client device.

20. The system of claim 17, wherein the operation on the first client device further comprises:

upon determining that the level of similarity exceeds the second specified threshold, sending a notification to the first client device.

21. The system of claim 20, wherein the notification declines the request to install the first application on the first client device.

22. The system of claim 20, wherein the notification comprises a recommendation indicating risk associated with installing the first application on the first client device.

23. The system of claim 17, wherein determining the level of similarity between the first client device and the second client device comprises comparing a combination of applications installed on the first client device with a combination of applications installed on the second client device.

24. The system of claim 17, wherein the one or more performance metrics of each of the first client device and the second client device include at least one of a number of errors, system speed, memory usage, CPU usage, disk accesses, and network latency.

* * * * *